United States Patent
Kellenbenz

[15] 3,668,483
[45] June 6, 1972

[54] DIRECT CURRENT SOLID STATE CIRCUIT BREAKER

[72] Inventor: Carl W. Kellenbenz, Baltimore, Md.

[73] Assignee: The United States of America as represented by the Secretary of the Navy

[22] Filed: Aug. 19, 1971

[21] Appl. No.: 173,055

[52] U.S. Cl. .................................. 317/33 SC, 317/22
[51] Int. Cl. .............................. H02h 3/08, H02h 7/00
[58] Field of Search ............. 317/33 SC, 33 C, 33 R, 22, 317/54; 321/45 C, 11, 18; 307/252 M

[56] References Cited

UNITED STATES PATENTS

| | | | |
|---|---|---|---|
| 3,535,592 | 10/1970 | Roveti | 317/33 SC |
| 3,369,154 | 2/1968 | Swain | 317/33 SC |
| 3,299,322 | 1/1967 | Roberts | 317/33 SC |

*Primary Examiner*—J. D. Miller
*Assistant Examiner*—Harvey Fendelman
*Attorney*—R. S. Sciascia, et al.

[57] ABSTRACT

The present invention relates to a solid state circuit breaker for use in DC circuitry associated with deep submergence vehicles. The device includes a pair of high current silicon controlled rectifiers to break both sides of the direct current power lines. The device further includes current sensing means to sense over-current conditions, a capacitive discharge turn-off circuit for driving the SCR to the nonconductive state, and an inhibit circuit for preventing turn-on of the SCR's when the capacitor in the turn-off circuit is not fully charged. Further, the system includes a low voltage remote control circuit to allow turn-on and turn-off of the SCR's without the danger of having high voltage leads within the submerged vehicle.

8 Claims, 4 Drawing Figures

INVENTOR.
CARL W. KELLENBENZ

DIRECT CURRENT SOLID STATE CIRCUIT BREAKER

The invention described herein may be manufactured and used by or for the Government of the United States of America for Governmental purposes without the payment of any royalties thereon or therefor.

BACKGROUND OF THE INVENTION

In deep submergence vehicles the space within the pressure hull is usually at a premium, hence, wherever possible all equipments are placed outside the pressure hull thus subjecting them to the high pressure of the surrounding seawater. It is common practice to enclose electrical components in an inert fluid which the seawater than presses against, thus insolating the electrical circuits from the conductive seawater. In the past, attempts have been made to employ circuit breakers of the mechanical type surrounded by this inert fluid. These mechanical devices which include switches, relays, and circuit breakers were required to operate in the high pressure fluid environments. Some of these devices fail to interrupt the current flow because of the build-up of conductive solids in the inert fluid. These solids occur from the decomposition of these inert fluids, the decomposition is caused by arcing which always occurs when the mechanical contacts make and break. The contamination products are generally of the carbon type and when sufficient contaminates are present, the fluid which formally was inert now becomes relatively conductive. Thus, the effectiveness of the circuit breaker is destroyed.

Mechanical switches also have the disadvantage that the time required interrupt the current flow is several orders of magnitude larger than that of the present invention.

Fuses have been used as circuit protection devices but they have the disadvantage that the current required to open the fuse while immersed in a high pressure compensating inert fluid can be several hundred percent higher than that current required for the same fuse at atmospheric pressure.

Thus, it is an object of the present invention to provide a circuit breaker of a nonmechanical type.

It is another object of the invention to provide a circuit breaker which requires little or no maintenance.

It is another object of the invention to provide a circuit breaker which can be operated from within the pressure hull of the vehicle by a voltage control circuit.

It is another object of the invention to provide a circuit breaker which may operate to disconnect the power source from the defective equipment in a much shorter time than prior art devices.

SUMMARY OF THE INVENTION

The present invention relates to a solid state circuit breaker for use in high current DC situations. The circuit breaker employs one silicon controlled rectifier in each side of the DC circuit, sensing means to sense over-current conditions and to transmit this information to over-current detectors which trigger a capacitive discharge turn-off circuit that drives the silicon controlled rectifiers into the nonconductive state. Inhibit circuits are provided to insure that the silicon controlled rectifiers are not turned on before the turn-off capacitors are fully charged. Further, when the SCR is driven into the conducting region, current through the SCR maintains the SCR in the conductive state. Thus, a continuous turn-on signal at the gate of the SCR is not required.

DESCRIPTION OF THE PREFERRED EMBODIMENT

In the prior art the circuit breaking devices usually employ an inductor in one or both sides of the DC line to ensure that the circuit breaking device has sufficient time to operate if the circuit is energized into a short circuit, since the inductor controls the rise time of the current from the voltage source. If this inductor were not present it would be possible for the current to rise so quickly that either circuit breaking device itself, or the voltage source could be damaged. It should be noted that the circuit breaker of the present device does not employ such inductors, it is desirable to eliminate these inductors as they are quite large physically and are rather expensive. The present circuit breaker does not employ these inductors because of the rapid operation of the solid state devices employed in the present solid state circuit breaker. Most voltage sources which include DC generators, lead acid batteries, silver zinc batteries, and fuel cells all have an inherent internal impedance which limits the rate of current rise from these devices. From tests run it has been found that the present device operates in such a short period of time (approximately 15 microseconds), that the internal impedance of the voltage sources limits the rise time of the current from the sources such that it takes approximately 1 millisecond for the current to reach the short circuit value. Thus, the operation of the present circuit breaker is several orders of magnitude faster than the rise of current and hence no inductors are necessary to limit the rate of rise current from the voltage sources.

Figure 1:
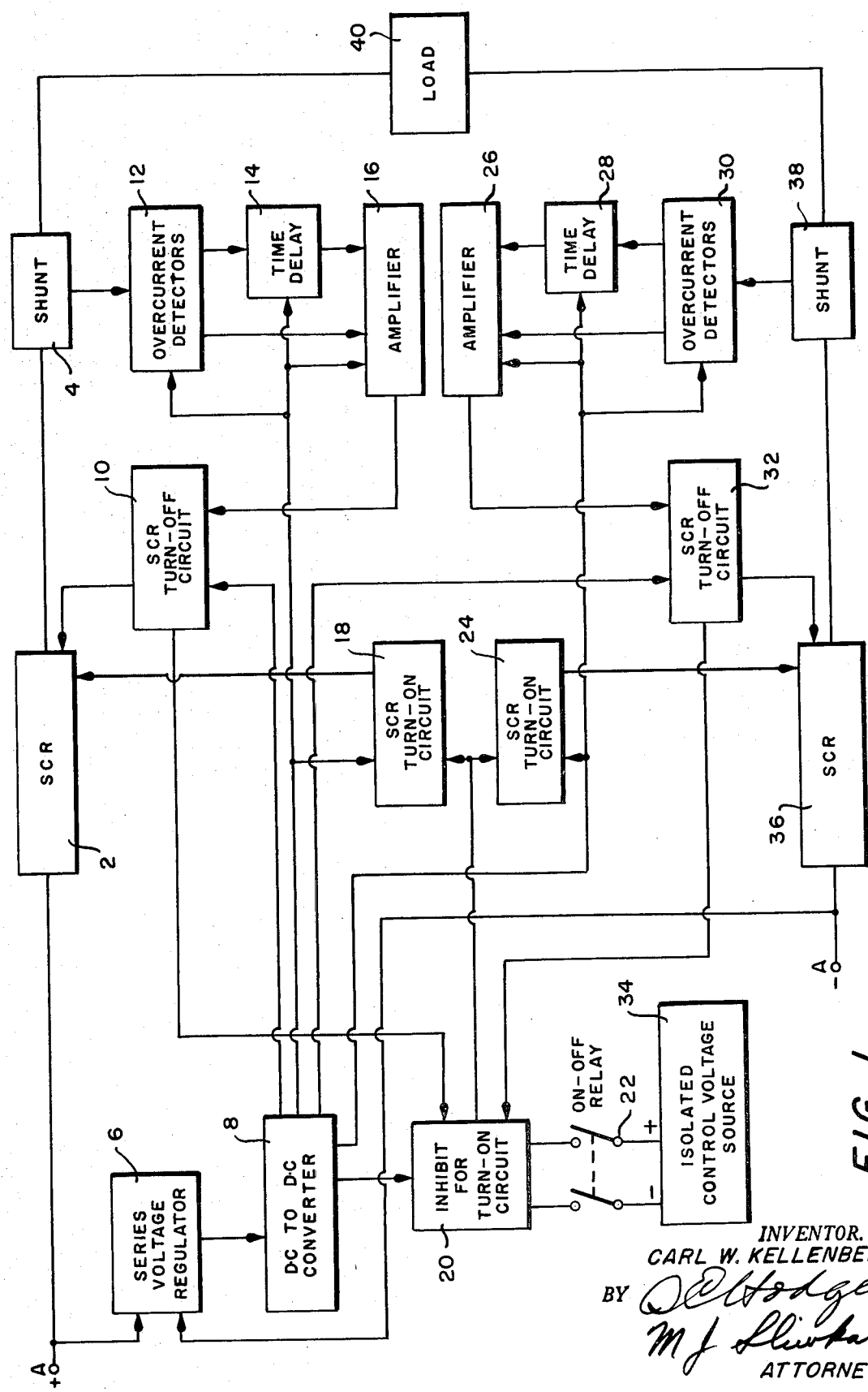
FIG. 1 discloses a block diagram of the solid state circuit breaker system.

The general operation of the solid state circuit breaker can best be described by referring to the block diagram shown in FIG. 1. A voltage source (not shown) is connected to the plus and minus terminals at point A. The high current SCR's 2 and 36 are employed to break both sides of the direct current power source because if a ground occurred such that only one side of the line were protected it would be possible to short out the SCR without having it break the circuit. The series voltage regulator 6 and the DC to DC converter 8 are provided to power the SCR turn-on and turn-off circuit and the inhibit for turn-on circuit 20. The SCR circuit breaker is operated as follows. A signal from the isolated control voltage source usually within the submerged vehicle is sent to relay 22; closing relay 22 causes a signal to be sent from the inhibit circuit 20 to the SCR's turn-on circuits 18 and 24, which simultaneously provide pulse signals to SCR's 2 and 36, respectively, thereby driving the SCR's to their conductive region. At this point current begins to flow from the voltage source through the SCR's to the load 40. Shunts 4 and 38 sense the current via the over-current detectors, one is a short circuit detector and the other is a detector combined with a time delay 14, 28 which prevents the SCR's from being turned off by momentary surges on the power lines which may be caused by initially connecting the device to load 40. If an over-current condition is sensed the signal is amplified by amplifiers 16 and 26 and sent to the SCR turn-off circuits 10 and 32. These circuits then discharge their turn-off capacitors across anode to cathode of the SCR's 2 and 36, driving them to a nonconductive region, hence breaking the circuit. It should be noted that during normal operation the primary current through the SCR's maintain the SCR's in the conductive region and no voltage is applied to the gate of the SCR except for initial turn-on. Since no signal is applied to the gate of the SCR during normal operation there is no power drain on the system due to such a signal. The circuit thus conserves power which usually is vital in a deep submergence vehicle. Note that in the prior art usually a continuous signal is required to maintain the circuit breaking SCR in the conductive position.

Figure 2:
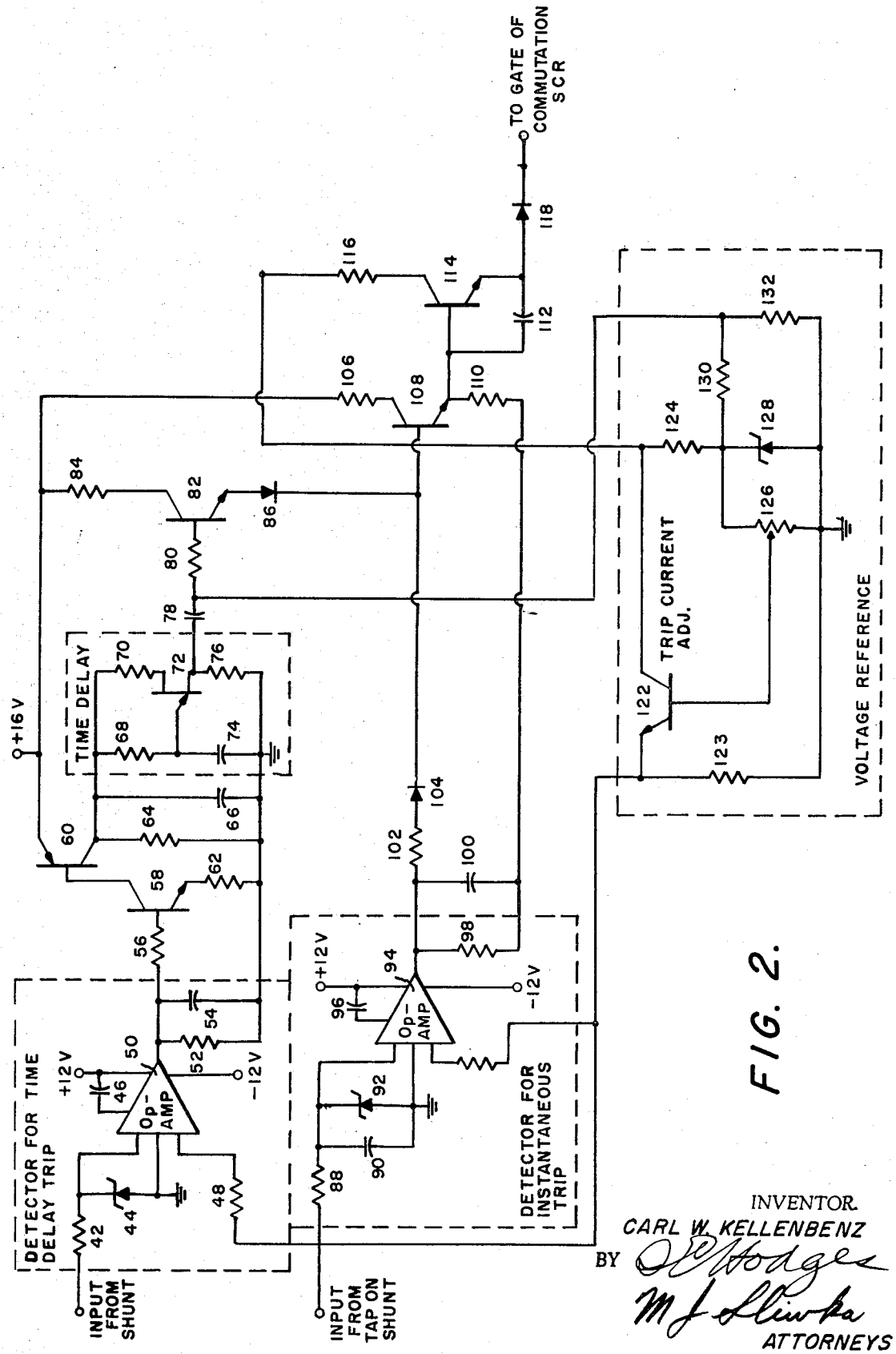
FIG. 2 shows the schematic diagram of the over-current detectors, time delay and amplifier circuits.

FIG. 2 shows a typical circuit for the shunt, over-current detectors, time delay and amplifier as shown in the block diagram of FIG. 1. These types of circuits have been shown in the prior art. However, the schematic is included to show a circuit which will work in the present system. Modifications by one skilled in the art can obviously be made. The invention of the present devices lies primarily in the turn-on, turn-off and control circuitry which will now be described in detail.

Figure 3:
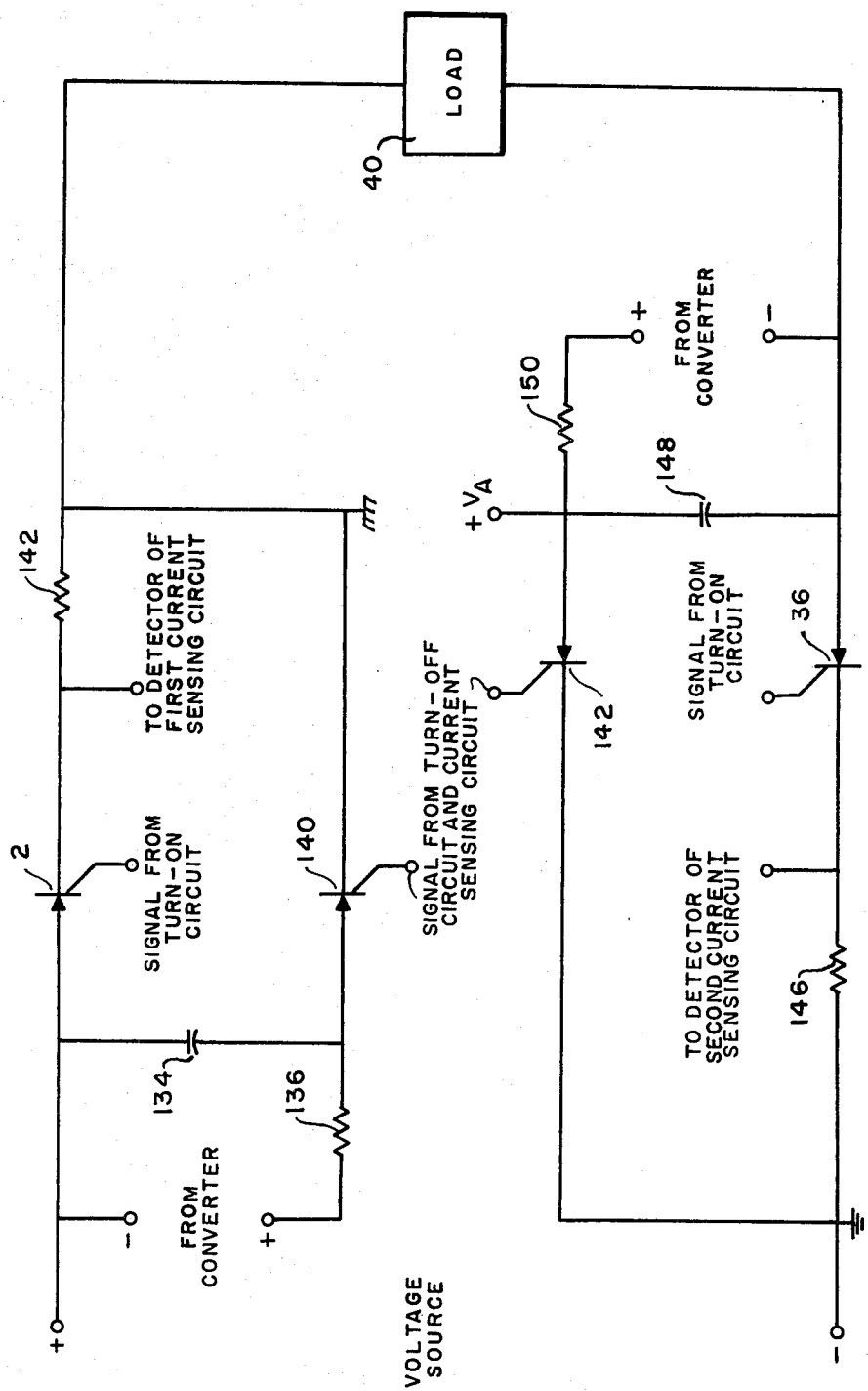
FIG. 3 shows the schematic diagram of the SCR turn-off circuitry.

FIG. 3 shows the schematic diagram of two SCR turn-off circuits. A first turn-off circuit to return the load current carrying SCR's in the positive voltage source line to the nonconductive state after previously being energized and a second turn-off circuit to return the load carrying SCR 36 in a negative line to the nonconducting state. These two turn-off circuits must operate independently because in an application where there is a high probability of grounds occurring on the power lines, a double ground on one side of the circuit could short out one SCR and thus the other SCR must be relied upon to open the circuit.

The capability of independently interrupting both the positive and negative sides of voltage source is considered one of the unique features of the present circuit.

The operation of the SCR turn-on circuit can best be described by considering the condition when the circuit breaker is energized into a short circuit.

Figure 4:
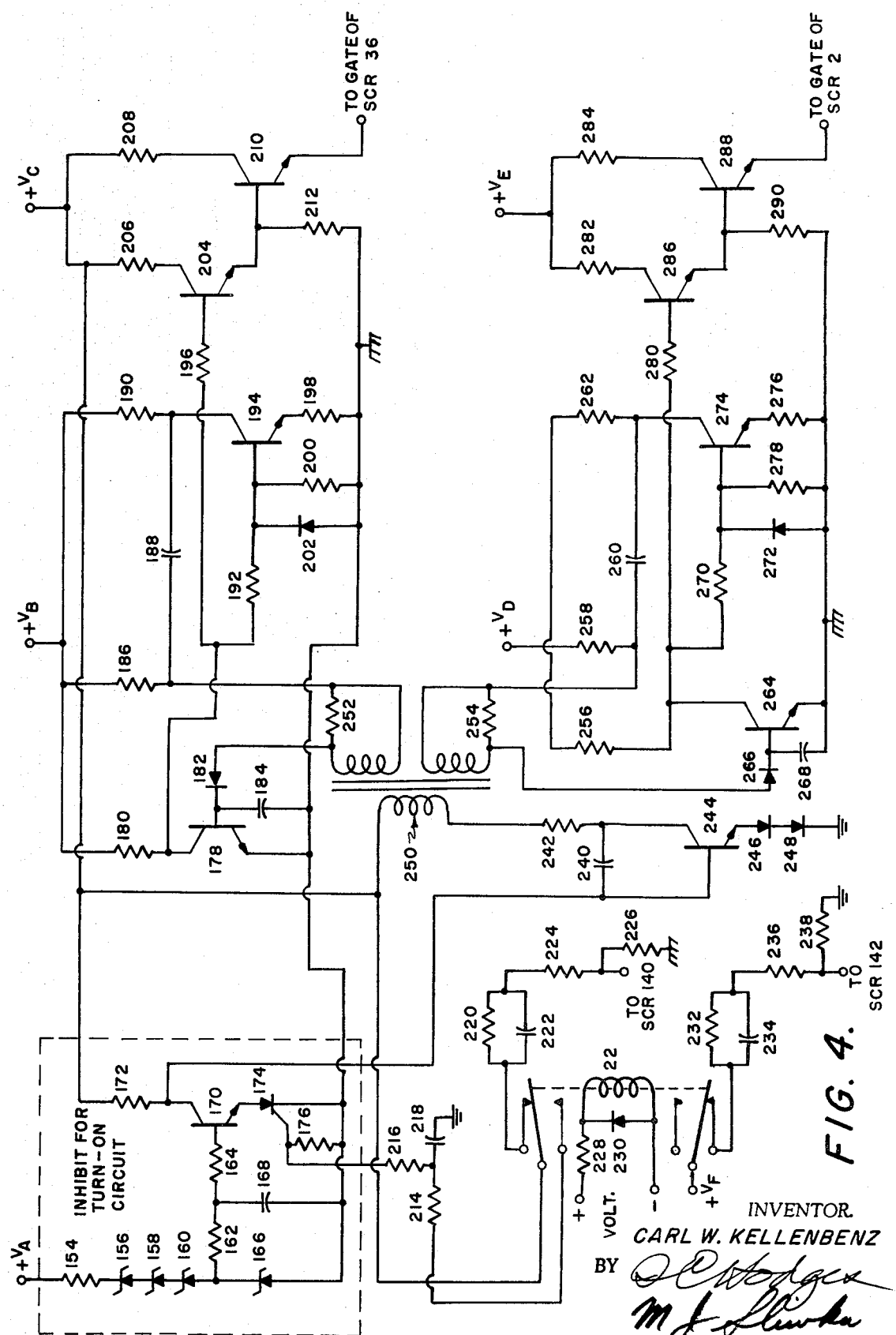
FIG. 4 shows the schematic diagram for the SCR turn-on circuitry along with the low voltage control circuit.

Referring to FIG. 3, to allow the SCR's 2 and 36 to be energized, the voltage designated as $+V_A$ on the turn-off circuit in the negative line must be at such a level as to indicate that the turn-off capacitor 148 is sufficiently charged to provide the capability of returning SCR 36 to the nonconducting state for current values slightly greater than the instantaneous trip current of the circuitry. When the voltage on capacitor 148 is at the proper level the string of the Zener diodes 156, 158, 160, and 166 (shown in FIG. 4) break down and provide a base current to transistor 170 by way of the resistor capacitor network 162, 164, and 168. This resistor capacitor network allows transistor 170 to become conductive at such a rate that the circuit breaker will not be repeatedly energized into an overload or short circuit condition at a repetition rate equal to the time constant of the turn-off capacitor charging network. The circuit breaker can only be energized when transistor 170 is conductive indicating that the turn-off capacitors 148 and 134 are charged and ready to return the SCR's to the nonconductive state immediately. If transistor 170 is not in its conductive state then the circuit breaker is inhibited from being closed. This inhibit circuit is connected directly across the turn-off capacitors 148 and 134. If, for any reason, the turn-off capacitors are not fully charged the circuit breaker will be inhibited and cannot be turned on. FIG. 3 shows only the monitoring of the charge on capacitor 148 in the turn-off circuit in the negative line. This is sufficient indication of the state of charge of both turn-off capacitors 148 and 134, since the charging time for these two capacitors are made the same by making capacitor 134 equal to capacitor 148 and resistor 150 equal to resistor 136. When capacitors 148 and 134 are indicated to be in the charged condition then the circuit breaker may be triggered to the on or energized condition by the control relay 22. The control relay 22 is activated by voltage from the low voltage control source. The control relay includes resistor 228 which allows adjustment of the circuit for use by different low voltage control sources. Diode 230 suppresses the back EMF of the control relay coil to eliminate inductive voltages on the control voltage source and switching devices. Once the control relay is energized, SCR 174 receives a gate signal by way of the resistor capacitor networks 214, 216, 218. This resistor capacitor network prevents the SCR from receiving multiple pulse signals due to the bounce of the relay contacts. Resistor 176, connected to gate cathode of SCR 174, reduces the possibility of stray voltage transients triggering the SCR 174. Prior to the triggering of SCR 174 by way of the relay there exists a current through the pulse transformer primary 250 by current conduction through resistor 242, diodes 246, 248 and transistor 244. The base current allowing transistor 244 to be conductive is supplied through resistors 172 until SCR 174 becomes conductive. Diodes 246 and 248 increase the voltage drop between the base of transistor 244 and ground to insure that transistor 244 will be nonconductive when SCR 174 and transistor 170 become conductive. Capacitor 240 provides feedback from collector to base of transistor 244 to reduce the possibility of transistor 244 becoming nonconductive due to possible fluctuations in power supply voltage. Transistor 244 will now become nonconductive very rapidly because of the abrupt loss of base current caused by the conduction of SCR 174. The abrupt change in current in the winding of transformer 250 will provide a pulse triggered signal to trigger each of the monostable multivibrators of the SCR turn-on circuit. Resistors 252 and 254 load the secondary of the pulse transformer 250 to dampen the pulse so that only one trigger pulse is supplied to each multivibrator circuit. The two multivibrator circuits are fed with voltages $V_B$ and $V_C$ and $V_D$ and $V_E$ are at different potentials since the load is connected between SCR 2 and SCR 36. The pulses which trigger the multivibrators are produced across resistors 252 and 254 are such that transistors 178 and 264 become nonconductive for a time determined by resistors 186 and 258, and capacitors 188 and 260. When transistors 178 and 264 become nonconductive base current flows to transistors 204 and 286 through resistors 180 and 196 and 256 and 280, respectively. This base current causes transistors 204 and 286 to conduct base current to transistors 210 and 288 through resistors 206 and 282. Base currents to transistors 210 and 288 allow transistors 210 and 288 to provide a current through resistors 208 and 284 to SCR's 2 and 36, respectively. Resistors 208 and 284 are chosen so that the gate current is of a high amplitude in order to provide a gate signal which give SCR's 2 and 36 the capability of being energized to a load where the rate of rise of forward current is very high. This high gate current lasts for only a short time, approximately 5–10 microseconds so that the gate signals are rapidly removed to allow SCR's 2 and 36 to be returned to the nonconducting state immediately in the event the SCR's are energized into a short circuit. Under normal operating conditions SCR's 2 and 36 are maintained in the conductive state by the normal latching current of the SCR's in the main direct current circuit and therefore no control power is wasted in maintaining a gate signal to the SCR's. The circuit breaker is now in the ON condition and may be turned off by a trip signal from the over-current detectors which will gate SCR's 140 and 142 into conduction. When SCR's 140 and 142 become conductive capacitors 134 and 140 are shorted across SCR's 2 and 36, respectively, thereby reverse biasing SCR's 2 and 36 and thus returning them to the nonconducting state. Resistors 136 and 150 in the SCR turn-off circuits limit the charging current of the turn-off capacitors. When the capacitors 134 and 140 are recharged the system is ready to repeat the turn-on cycle described above.

If the circuit is not energized into a short the system will turn-on as described above. In order to turn the circuit breaker off the control relay 22 is returned to the position shown in FIG. 4. This allows a trigger pulse to be applied to the gates of SCR's 140 and 142 via the resistor capacitor circuits 220, 222, 224, 226 and 232, 234, 236, 238 respectively. This pulse causes SCR's 140 and 142 to become conductive thereby shorting the turn-off capacitors 134 and 148 across the circuit breaking SCR's 2 and 36 to drive the SCR's into the nonconducting regions as described above.

The preferred embodiment of the present invention has been described, however it is to be understood that obvious modifications may be made by one skilled in the art and these modifications may be made without department from the spirit of the scope of the invention as described in the following claims.

What is claimed is:

1. A solid state circuit breaker system for use on a DC power line comprising:
   isolated control circuit means for turning on the solid state circuit breaker system;
   solid state circuit breaker means in both sides of the DC line for controlling the flow of current in said line;
   shunt means serially connected in said DC lines subsequent to said circuit breaker means for sensing the flow of current in said lines and for generating a signal proportional thereto;

over-current detection circuit means for receiving the signal from said shunt means, detecting the existence of an over-current condition and generating an over-current output signal when said over-current condition exists;

turn-off circuit means responsive to said over-current output signal for turning off said solid state circuit breaker;

turn-on circuit inhibit means for preventing the turn-on of said circuit breaker unless said turn-off circuit means is operable; and turn-on circuit means responsive to said control means for placing said circuit breaker in the "on" condition.

2. A system as defined in claim 1 wherein said solid state circuit breaker means are independently operable for breaking only one of said DC lines.

3. A system as defined in claim 2 wherein said solid state circuit breaker means includes two silicon controlled rectifiers.

4. A system as defined in claim 3, wherein said silicon controlled rectifiers are maintained in the conductive state by the DC current flowing therethrough.

5. A system as defined in claim 4, wherein said turn-off circuit means includes a capacitive discharge type circuit for driving said SCR's from the conductive to the nonconductive state.

6. A system as defined in claim 5, wherein said isolated control means includes a low voltage relay remotely operable to control said circuit breaker.

7. A system defined in claim 6, wherein said turn-on circuit includes a monostable multivibrator operable from said isolated control circuit for generating a single turn-on pulse which drives said silicon controlled rectifiers to the conductive condition and then said turn-on pulse is immediately removed.

8. A system as defined in claim 7, wherein said turn-on circuit inhibit means includes a plurality of serially connected Zener diodes which are maintained in the conductive state by the voltage on the capacitor in said capacitive turn-off circuit and which prevent the turn-on circuit multivibrators from operating if said Zener diodes are not in the conductive state.

* * * * *